(Model.)

B. H. GRISWOLD.
SPEAR FOR REMOVING CASING FROM OIL WELLS.

No. 348,520. Patented Aug. 31, 1886.

Witnesses

Inventor:

UNITED STATES PATENT OFFICE.

BRADFORD HOWARD GRISWOLD, OF MILLERSTOWN, PENNSYLVANIA.

SPEAR FOR REMOVING CASINGS FROM OIL-WELLS.

SPECIFICATION forming part of Letters Patent No. 348,520, dated August 31, 1886.

Application filed April 18, 1885. Serial No. 162,716. (Model.)

*To all whom it may concern:*

Be it known that I, BRADFORD HOWARD GRISWOLD, of Millerstown, county of Butler, and State of Pennsylvania, have invented a new and useful Improvement in Oil-Well Tools—viz., a spear for removing casings from oil-wells—of which the following is a specification.

Figure 1:
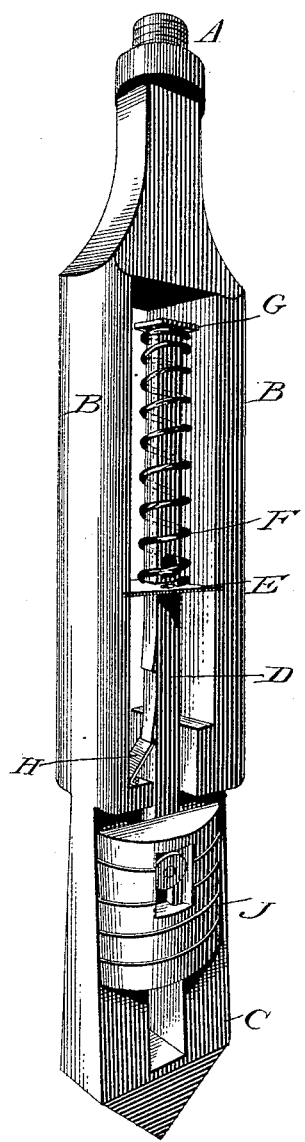
Figure 2:
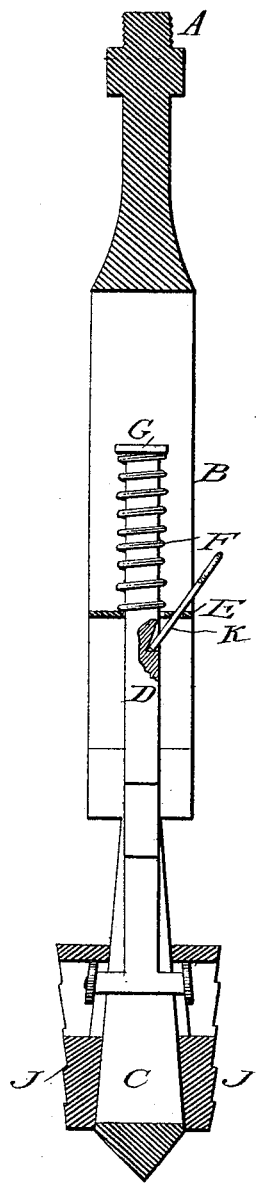

In the accompanying drawings, Figure 1 is a representation of said casing-spear, showing the position of the parts when drawn out of the well. Both sides of the said spear being similar in construction, one side only is shown. Fig. 2 is a vertical section of said spear in readiness to be lowered into the well and parts in position to take hold of the casing.

The letters in Figs. 1 and 2 refer to the same parts throughout.

The invention will be first described in connection with the drawings, and then pointed out in the claim.

A is a pin with threads, by means of which it is attached to the auger-stem; B B, reins welded to the shank of A. The lower extremities of the reins B B form C—a tapering plane, butt downward. This plane is slotted to allow D, an inverted T, to move up and down. D is notched on one side to receive K, as shown in Fig. 2. On the opposite side it is furnished with shoulders, which, resting on H, as shown in Fig. 1, holds D in position to allow the "spear" to be drawn from the well. It will thus be seen that D moves perpendicularly through and is held in place by E and the slot in C.

E is a bridge designed to hold D in position and furnish a rest for F; F, a spiral spring encircling D and resting on E at lower extremity, against the nut G at upper extremity; H, a dog designed as a rest for D when in position, as shown in Fig. 1. H is hinged to B by means of a pin.

K is a lock-pin attached to inside of one of the reins B, the other end to be placed in a notch in D, as shown in Fig. 2; J J, wickered slips slotted to receive the head of D, and secured to D by means of nuts countersunk in the slips. The slips J J have their backs convex to conform to the inside of the casing, and their faces beveled to overcome the taper of the plane C, on which they move, thus making their entire surface bear equally upon the inside of the casing. The slips J J are provided with short slots, which permit them to move up on the plane C in passing down the casing, while D remains fixed, as shown in Fig. 2.

Having thus described my invention, I claim as new and desire to secure by Letters Patent—

A casing-spear for oil-wells provided with reins terminating in a tapering plane, a movable inverted T, to the head of which is attached slips slotted to enable them to move up and down on a tapering frame, a spiral spring designed to raise the inverted T when it is desired to remove the spear from the well, a lock-pin to hold the T down when lowering the spear into and a dog to hold the T up when withdrawing the spear out of the well.

BRADFORD HOWARD GRISWOLD.

Witnesses:
A. M. NICHOLS,
G. P. ZADDES.